(12) United States Patent
Lin

(10) Patent No.: US 7,894,189 B2
(45) Date of Patent: Feb. 22, 2011

(54) PORTABLE COMPUTER WITH AN EXPANDABLE HANDLE

(75) Inventor: Li-Sheng Lin, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 228 days.

(21) Appl. No.: 12/254,829

(22) Filed: Oct. 20, 2008

(65) Prior Publication Data

US 2010/0020490 A1   Jan. 28, 2010

(30) Foreign Application Priority Data

Jul. 25, 2008   (TW)   .............................. 97213310 A

(51) Int. Cl.
*G06F 1/16*   (2006.01)
(52) U.S. Cl. .................. 361/679.59; 190/115
(58) Field of Classification Search ............ 361/679.59; 190/115; 16/429, 115
See application file for complete search history.

(56) References Cited

U.S. PATENT DOCUMENTS

| 3,513,952 | A | * | 5/1970 | Warner, Jr. ................. 16/113.1 |
| 4,895,231 | A | * | 1/1990 | Yamaguchi et al. ......... 190/115 |
| 4,951,241 | A | * | 8/1990 | Hosoi et al. ............ 361/679.09 |
| 5,011,198 | A | * | 4/1991 | Gruenberg et al. .......... 190/115 |
| 5,075,926 | A | * | 12/1991 | Jeong .......................... 16/429 |
| 5,235,495 | A | * | 8/1993 | Blair et al. ............. 361/679.26 |
| 5,485,922 | A | * | 1/1996 | Butcher ...................... 190/109 |
| 6,208,504 | B1 | * | 3/2001 | Cho et al. .............. 361/679.59 |
| 6,318,552 | B1 | * | 11/2001 | Godshaw .................... 190/109 |
| 2010/0027218 | A1 | * | 2/2010 | Lin et al. ............... 361/679.59 |

* cited by examiner

*Primary Examiner*—Lisa Lea-Edmonds
(74) *Attorney, Agent, or Firm*—Winston Hsu; Scott Margo

(57) ABSTRACT

A portable computer includes a host including a housing, an expandable handle connected to the housing in an expandable manner, and a monitor pivoted to the host.

5 Claims, 5 Drawing Sheets

PORTABLE COMPUTER WITH AN EXPANDABLE HANDLE

BACKGROUND OF THE INVENTION

1. Field of the Invention

The present invention relates to a portable computer, and more particularly, to a portable computer with an expandable handle.

2. Description of the Prior Art

In modern information society, portable electronic devices are widely used in every field. A large quantity of data is communicated, processed, and stored in digital data format, thus computers used for reading and accessing data have become very important tools. Especially portable computers, such as notebooks, allow users to carry at any place by their small size, lightness, and portability. However the portable computers burden the user heavily when carrying them by hands for a long time. There is a need for mechanical design to provide the user to carry the portable computer easily.

SUMMARY OF THE INVENTION

According to the claimed invention, a portable computer includes a host including a housing, an expandable handle connected to the housing in an expandable manner, and a monitor pivoted to the host.

According to the claimed invention, the housing includes an upper casing and a lower casing, and the expandable handle is connected to the lower casing in an expandable manner.

According to the claimed invention, the expandable handle includes a fixing tube connected to the lower casing, and a sliding tube sleeved outside the fixing tube in a slidable manner.

According to the claimed invention, a hook is disposed on the fixing tube and a slot is formed on an inner side of the sliding tube and located in a position corresponding to the hook for wedging the hook so as to constrain relative motion of the fixing tube and the sliding tube.

According to the claimed invention, the hook is an elastic structure.

According to the claimed invention, the expandable handle further comprises a handle connected to the sliding tube.

According to the claimed invention, an indentation is formed on the handle.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
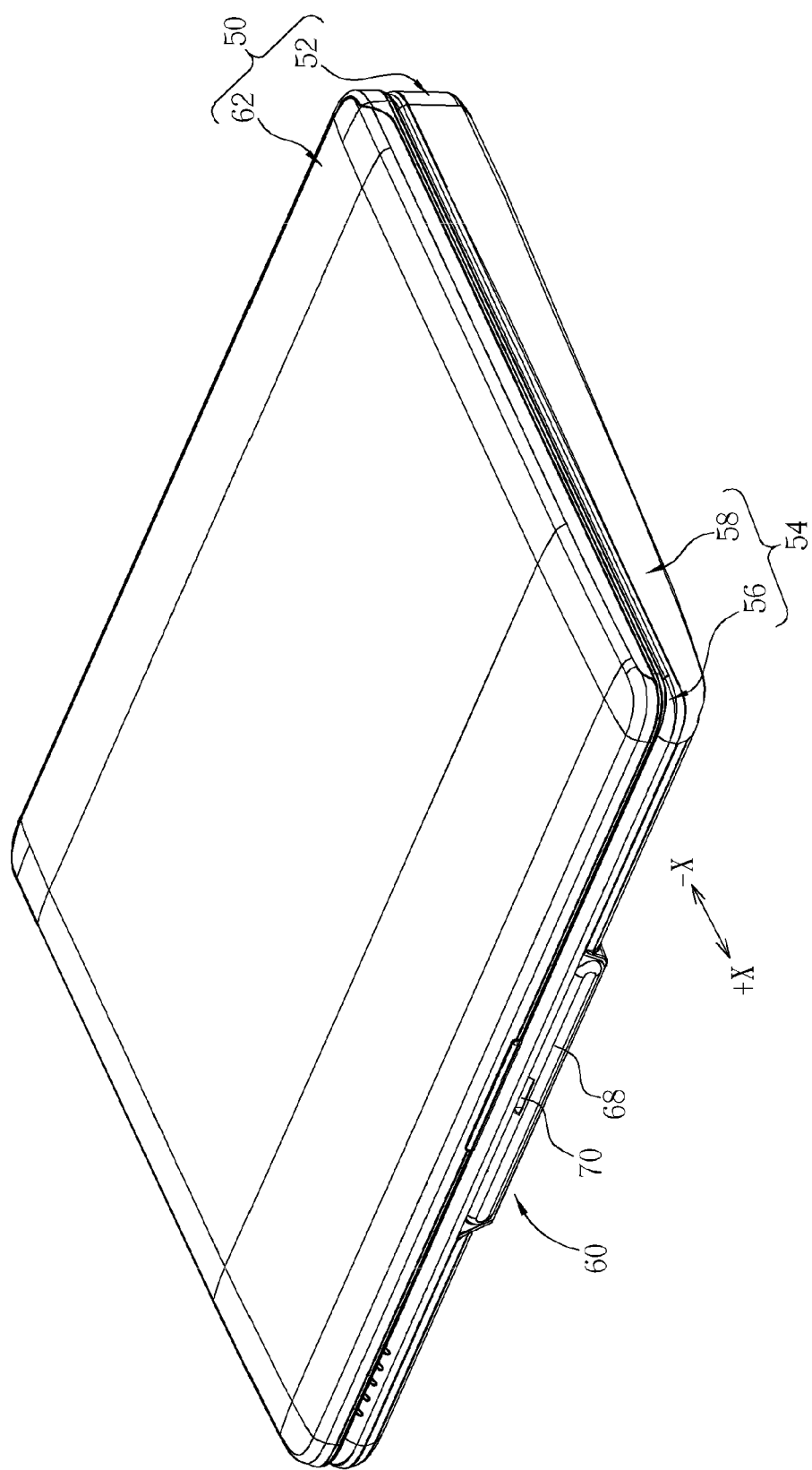
FIG. 1 and FIG. 2 are schematic drawings of a portable computer at different conditions according to a preferred embodiment of the present invention.
Figure 2:
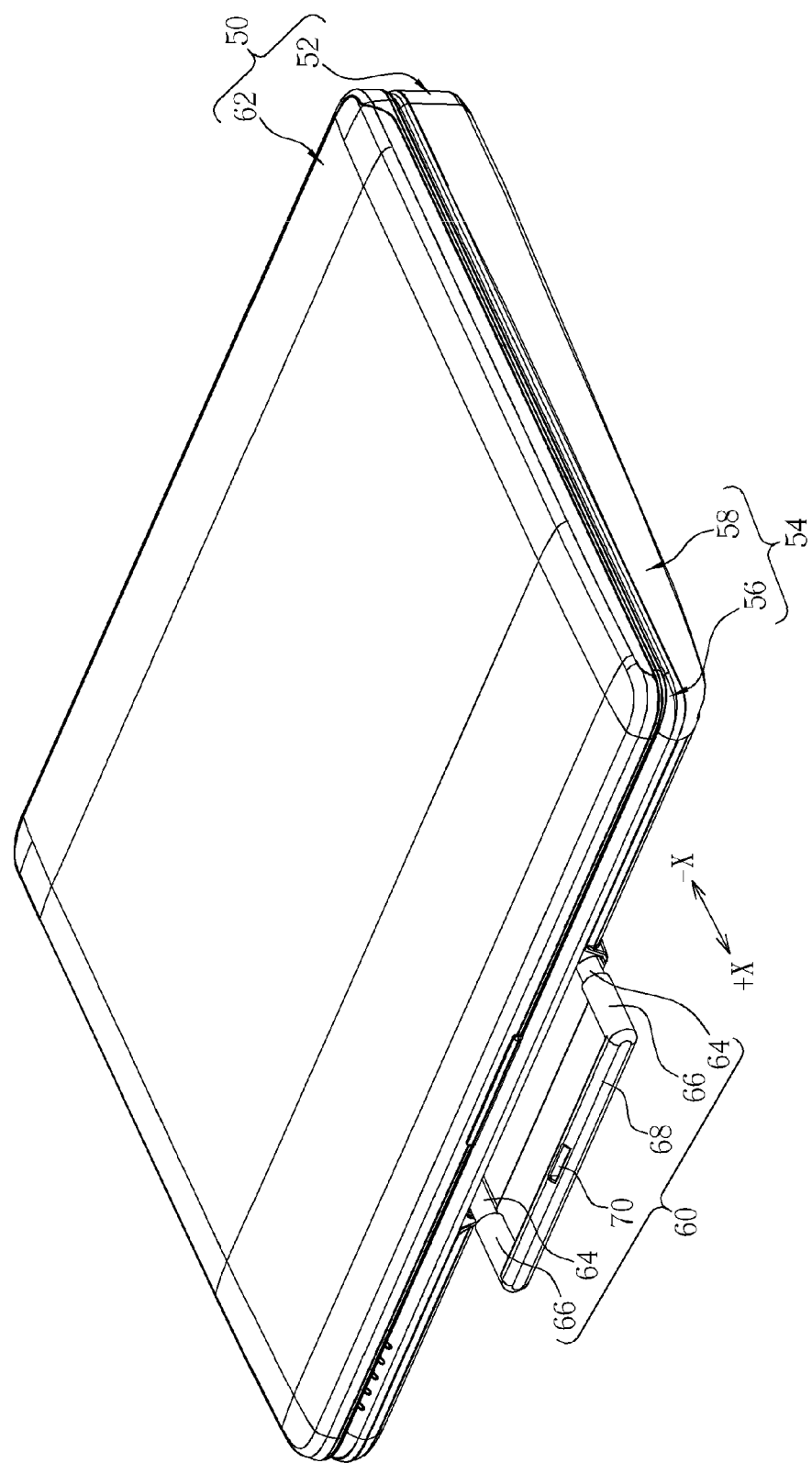

Please refer to FIG. 1 and FIG. 2. FIG. 1 and FIG. 2 are schematic drawings of a portable computer 50 at different conditions according to a preferred embodiment of the present invention. The portable computer 50 can be a notebook computer. The portable computer includes a host 52 including a housing 54. The housing 54 includes an upper casing 56 and a lower casing 58 for covering internal components inside the host 52. The portable computer 50 further includes an expandable handle 60 connected to the lower casing 58 of the housing 54 in an expandable manner. The portable computer 50 further includes a monitor 62 pivoted to the host 52. As shown in FIG. 1, the expandable handle 60 is contained inside the housing 54. When the user wants to carry the portable computer 50, the expandable handle 60 can be drawn out in +X direction as shown in FIG. 2. Therefore, the user can hold the expandable handle 60 to carry the portable computer 50. When the expandable handle 60 is contained inside the housing 54, the expandable handle 60 can not be exposed out of the housing 54 so as to main aesthetic feeling of outward appearance.

Figure 3:
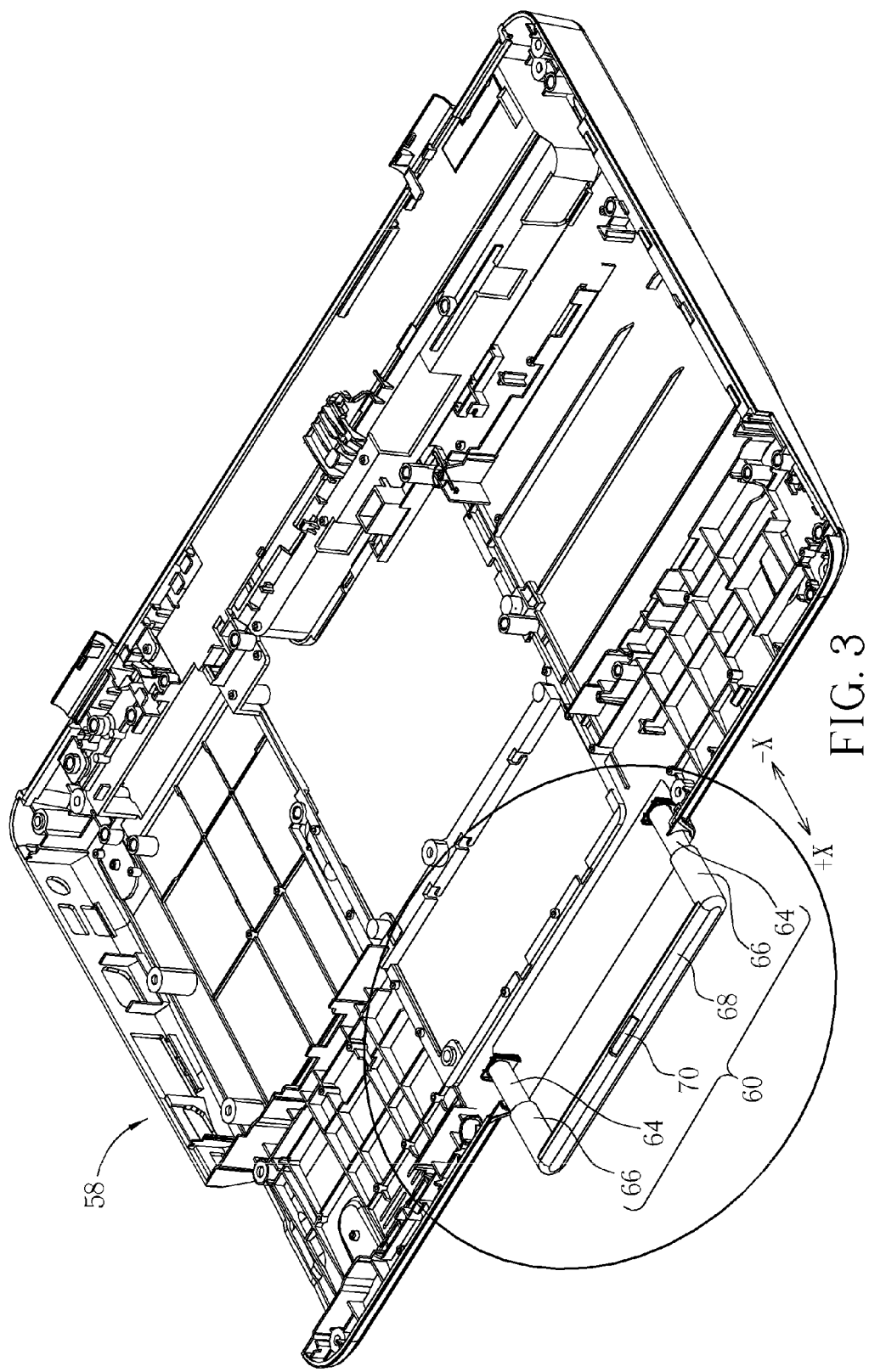
FIG. 3 is a schematic drawing of a lower casing of a housing connecting with an expandable handle according to the preferred embodiment of the present invention.

Please refer to FIG. 3. FIG. 3 is a schematic drawing of the lower casing 58 of the housing 54 connecting with the expandable handle 60 according to the preferred embodiment of the present invention. The expandable handle 60 includes two fixing tubes 64 connected to the lower casing 58, and two sliding tubes 66 sleeved outside the fixing tubes 64 respectively in a slidable manner. The expandable handle 60 further includes a handle 68 connected to the sliding tubes 66. The user can hold the handle 68 to carry the portable computer 50 or to slide the sliding tubes 66 relative to the fixing tubes 64. An indentation 70 is formed on the handle 68 so that the user can put a finger on the indentation 70 for drawing out the expandable handle 60 from the condition as shown in FIG. 1 to the condition as shown in FIG. 2.

Figure 4:
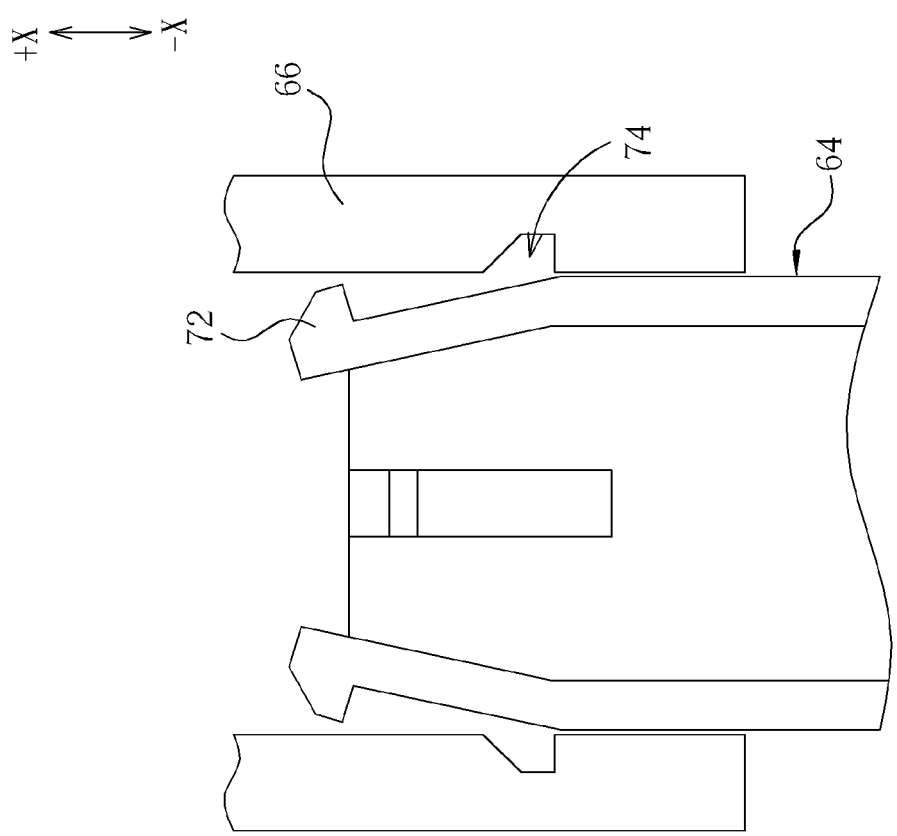
FIG. 4 and FIG. 5 are sectional diagrams of the expandable handle at different conditions according to the preferred embodiment of the present invention.
Figure 5:
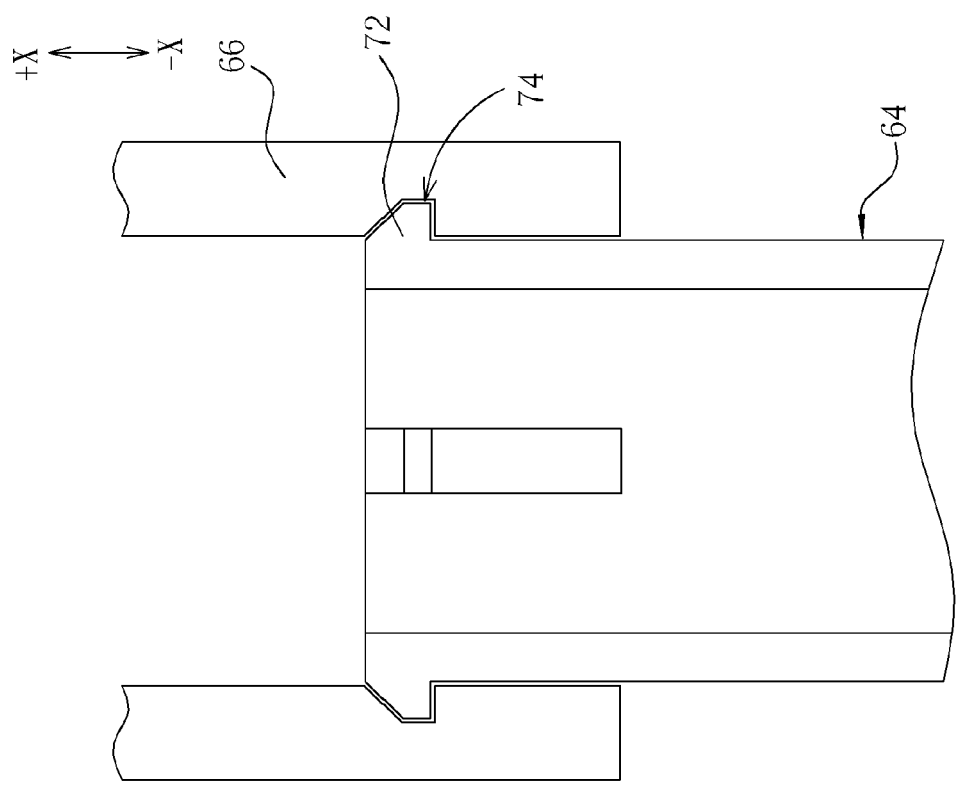

Please refer to FIG. 4 and FIG. 5. FIG. 4 and FIG. 5 are sectional diagrams of the expandable handle 60 at different conditions according to the preferred embodiment of the present invention. A hook 72 is disposed on the fixing tube 64, and a slot 74 is formed on an inner side of the sliding tube 66 and located in a position corresponding to the hook 72. The hook 72 can be an elastic structure. As shown in FIG. 4, the sliding tube 66 of the expandable handle 60 has not been drawn out completely. At this time, the inner wall of the sliding tube 66 compresses the hook 72 so as to result in elastic deformation of the hook 72. The frictional force between the inner wall of the sliding tube 66, the hook 72, and an outer surface of the fixing tube 64 can fix the sliding tube 66 on the fixing tube 64 so that the sliding tube 66 can not slide outside the fixing tube 64. When the user wants to carry the portable computer 50, the sliding tube 66 can be drawn out in + direction. As shown in FIG. 5, the sliding tube 66 of the expandable handle 60 has been drawn out completely. At this time, the hook 72 recovers elastically so as to be wedged inside the slot 74 for constraining relative motion of the fixing tube 64 and the sliding tube 66. That is, the sliding tube 66 can be fixed with the fixing tube 64. Additionally, the user can be aware that the sliding tube 66 of the expandable handle 60 has been drawn out completely due to a tactile feeling when the hook 72 is wedging inside the slot 74. Then the user can hold the expandable handle 60 to carry the portable computer 50, and the sliding tubes 66 can not separate from the fixing tubes 64. On the other hand, the user can push the sliding tubes 66 in −X direction for containing the expandable handle 60 inside the housing 54, and the frictional force between the inner wall of the sliding tube 66, the hook 72, and the outer surface of the fixing tube 64 can fix the sliding tube 66 on the fixing tube 64 so that the sliding tube 66 can not slide outside the fixing tube 64.

In addition, the expandable handle 60 can be disposed on other positions of the housing 54, such as on the upper casing 56 or on other side of the housing 54, or on the monitor 62. The working principle thereof is the same as the above-mentioned embodiment, and a further description is hereby omitted. The mechanical design of disposition of the expandable handle on the portable computer is within the scope of the present invention.

In contrast to the prior art, the present invention provides the expandable handle on the portable computer so that the user can carry the portable computer easily and conveniently. It's a labor-saving mechanical design. Besides, various patterns or slogans can be formed on the expandable handle so as to increase aesthetic feeling of outward appearance or to advertise the portable computer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable computer comprising:
   a host comprising a housing;
   an expandable handle connected to the housing in an expandable manner, the expandable handle comprising:
   a fixing tube connected to the housing;
   a hook disposed on the fixing tube; and
   a sliding tube sleeved outside the fixing tube in a slidable manner, a slot being formed on an inner side of the sliding tube and located in a position corresponding to the hook for wedging the hook so as to constrain relative motion of the fixing tube and the sliding tube; and
   a monitor pivoted to the host.

2. The portable computer of claim 1 wherein the housing comprises an upper casing and a lower casing, and the expandable handle is connected to the lower casing in an expandable manner.

3. The portable computer of claim 1 wherein the hook is an elastic structure.

4. The portable computer of claim 1 wherein the expandable handle further comprises a handle connected to the sliding tube.

5. The portable computer of claim 4 wherein the expandable handle further comprises an indentation formed on the handle.

* * * * *